United States Patent
Wu et al.

(10) Patent No.: US 12,513,373 B1
(45) Date of Patent: Dec. 30, 2025

(54) TRANSITION FILE FOR USE WITH CONTENT FILE AND RELATED METADATA

(71) Applicant: Amazon Technologies, Inc., Seattle, WA (US)

(72) Inventors: Yongjun Wu, Bellevue, WA (US); Abhishek Kumar, Bothell, WA (US); Alon Dulce, Woodinville, WA (US); Sitaraman Ganapathy, Issaquah, WA (US); Kyle Alexander Woo, Kent, WA (US); Varun Chadha, Seattle, WA (US); Tarun Jindal, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 298 days.

(21) Appl. No.: 18/368,742

(22) Filed: Sep. 15, 2023

(51) Int. Cl.
  *H04N 21/845* (2011.01)
  *H04N 21/84* (2011.01)

(52) U.S. Cl.
  CPC ......... *H04N 21/8456* (2013.01); *H04N 21/84* (2013.01)

(58) Field of Classification Search
  None
  See application file for complete search history.

(56) References Cited

U.S. PATENT DOCUMENTS

| | | | | |
|---|---|---|---|---|
| 2009/0285551 A1* | 11/2009 | Berry | .................... | H04N 5/76 386/250 |
| 2012/0315011 A1* | 12/2012 | Messmer | ................ | H04N 7/08 386/230 |
| 2014/0282690 A1* | 9/2014 | Keohane | .......... | H04N 21/44016 725/32 |
| 2016/0182939 A1* | 6/2016 | DelSordo | ............. | H04N 21/214 725/34 |
| 2024/0397155 A1* | 11/2024 | Braskich | .......... | H04N 21/23418 |

* cited by examiner

Primary Examiner — Heather R Jones
(74) Attorney, Agent, or Firm — Kilpatrick Townsend & Stockton LLP

(57) ABSTRACT

Techniques for transition files for use with content files and related metadata are described. In an example, a system determines a cue point of a video content file at which targeted content is to be presented. The system determines that a set of transition frames is to be presented at a start of a presentation of the targeted content or at an end of the presentation of the targeted content. The set of transition frames are available from a transition file that is separate from the video content file. The system generates metadata associated with the video content file. The metadata indicates that the set of transition frames is to be presented and an association of the set of transition frames with the cue point.

20 Claims, 9 Drawing Sheets

US 12,513,373 B1

TRANSITION FILE FOR USE WITH CONTENT FILE AND RELATED METADATA

BACKGROUND

A network service may be accessible to a computing device. Content provided by the network service can be presented by the computing device. For example, the network service includes a content streaming service for movies, television shows, and/or other multimedia playback. The content presented by the computing device can be movie content, television show content, and/or other multimedia content. This content can also be augmented with additional content that may be of interest to an operator of the computing device.

BRIEF DESCRIPTION OF THE DRAWINGS

Various embodiments in accordance with the present disclosure will be described with reference to the drawings, in which.

DETAILED DESCRIPTION

Figure 1:
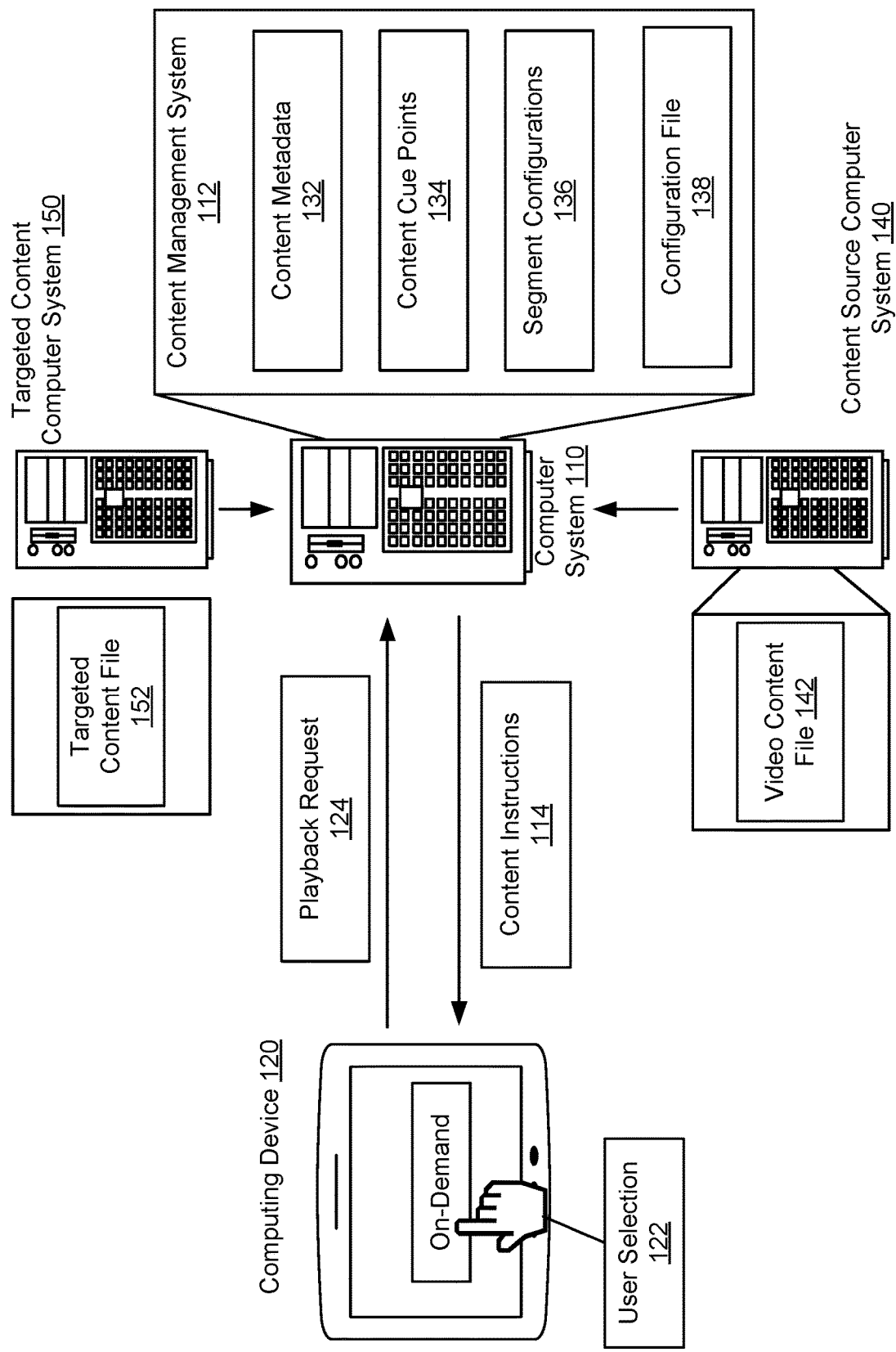
FIG. 1 illustrates an example of a computer system having a content management system, according to a particular embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments herein are directed to, among other things, transition files for use with content files and related metadata. A transition file can be generated based on metadata about user-requested content (e.g., a movie) and cue points of the user-requested content. A cue point can indicate a start of a segment (e.g, and advertisement segment) in which additional content (e.g., an advertisement) can be presented. The transition file can include transition frames (e.g., each frame showing a blank image or a dark, solid image) that are presented to transition between the user-requested content and the additional content. The computer system can determine whether a cue point is associated with a set of transition frames and a duration of the set of transition frames when they are present. The computer system can then determine whether an additional set of transition frames is to be presented in association with a cue point (e.g., if the user-requested content does not include transition frames before the cue point or if the transition frames are too short). In an example, the computer system can generate a configuration file on-the-fly in response to a request from a computing device for the user-requested content (e.g., at runtime or subsequent to receiving the request). The configuration file can indicate whether, for each cue point, a transition file is to be included, the location of the frames of the transition file relative to the cue point, and/or the length of the transition file. The computer system can send the user-requested content file, the configuration file, and additional content file (e.g., targeted content to be shown at the cue point in between transition frames) for presentation at the computing device.

To illustrate, consider an example of streaming a movie using a personal computing device. A computing device of a user can execute a content streaming application that supports a selection of a movie from a content library and video playback functionalities. Upon the selection via the content streaming application, the computing device can transmit a content request to a computer system that hosts a content streaming service accessible via the content streaming application. The computer system can send a response to the computing device, where the response includes instructions to present the requested movie and advertisements in segments available during the presentation of the movie. To do so, the computer system determines metadata and cue points of the movie. Based on the metadata and the cue points, the computer system determines whether transition frames are present before and after each cue point and if the transition frames meet a target duration. The computer system may determine that a cue point lacks a set of transition frames before the cue point, so the computer system can generate a configuration file indicating that a set of transition frames one second in length is to be presented before the cue point. The computer system selects a transition file that includes the set of transition frames and sends the transition file along with the movie, advertisements, and the configuration file to the computing device.

Embodiments of the present disclosure provide several technical advantages based on a transition file. For example, metadata indicating locations and durations of transition frames can be stored so that they do not have to be determined at runtime (a runtime determination may increase latency of the system). The relatively lower latency improves the overall quality of network service (e.g., the service that provides the content based on a request from a computing device of a user) and the overall quality of a content application executing on the computing device (e.g., this application supporting low latency responses to user requests).

In the interest of clarity of explanation, various embodiments are described herein in connection with video content (e.g., movies, television shows, etc.) and advertisements. The present disclosure is not limited as such and may relate to other forms of content.

FIG. 1 illustrates an example of a computer system 110 having a content management system 112, according to a particular embodiment. The computer system 110 can include any suitable type or combination of hardware. For example, the computer system 110 can be or include a single computer hardware (e.g., a server), or the computer system 110 can be or include multiple computer hardware (e.g., a server farm). Generally, the computer system 110 can include one or more non-transitory computer-readable storage media, one or more processors, and other suitable components. The one or more non-transitory computer-readable storage media can store code executable by the one or more processors for providing functionalities the content management system 112. Among the functionalities, the content management system 112 can support a content service (e.g., such as a video and/or audio streaming service).

The computer system 110 can be communicatively coupled to a computing device 120 over a data network (not illustrated). The computing device 120 can be operated by a user and include any suitable user device that may be used to request content via the computer system 110. In an example, the computing device 120 can include a personal computing device (e.g., a laptop computer, a desktop computer, a tablet computer, a smartphone, and the like). The computing device 120 can be associated with a user account and execute a content application. Upon a login via the content application, the content service of the content management system 112 becomes available to the computing device 120. In particular, the content application can support video and/or audio presentation.

A user selection 122 can be received via the content application and can indicate a request for specific content (e.g., a particular movie title or a particular television show episode), referred to as a video content file 142 or first content. The computer system 110 can receive the video content file from a content source computer system 140. The user selection 122 may cause the computing device 120 to transmit a playback request 124 to the computer system 110. This playback request 124 can indicate the specific content and can be associated with a context. The context can indicate information about the user account, the computing device 120, the content application, the timing of the request, and the like.

The playback request 124 can be received by the computer system 110. The content management system 112 can, based on the content request 124, identify the video content file 142, identify additional content (e.g., advertisements, sponsorships, etc.), and generate content instructions 114. The additional content can be content not explicitly requested by the user but that may be of interest to the user and is referred to as targeted content or second content. The additional content may be a targeted content file 152 received by the computer system 110 from a targeted content computer system 150.

The content instructions 114 can include data relating to the first content and the second content, such as their uniform resource locators (URLs) and information for inserting portions of the second content (e.g., the advertisements) during the presentation of the first content. The content instructions 114 can cause the computing device 120 (e.g., the content application) to present the first content and the second content to the entity. In an example, the content management system 112 outputs a configuration file 138 and the computer system 110 generates the content instructions 114 based on the configuration file 138. In particular, the computer system 110 can determine the actual second content (e.g., the actual advertisements) according to the configuration file 138.

To generate the configuration file 138, the content management system 112 can receive or determine (e.g., from a data store or another suitable source) content metadata 132 and content cue points 134. The content metadata 132 can include information about the first content, and the content cue points 134 can include time values or frame numbers, each corresponding to a start of a segment. The cue points 134 may be predefined, or the computer system 110 may run an algorithm on a video to determine or set the cue points 134. A portion of the second content (e.g., a subset of advertisement) can be presented during a segment. The presentation of the first content resumes after an end of the segment and continues until a start of the next segment. The content management system 112 can use the content metadata 132, the content cue points 134, and other suitable data, such as the context of the playback request 124, to determine or otherwise generate segment configurations 136. The segment configurations 136 can include information relating to each segment and slots per segment (where each slot is usable to present a particular portion of the second content, such as a particular advertisement). The content management system 112 can use the segment configurations 136 to generate the configuration file 138. The configuration file 138 can include the metadata and the configuration.

In an example, the video content file 142 may include or exclude transition frames. Transition frames may be black frames or other transitional frames that are associated with a cue point and transition between a presentation of the video content file 142 and the targeted content file 152. In addition, the targeted content file 152 may include or exclude transition frames before or after the targeted content. In instances in which the combination of the video content file 142 and the targeted content file 152 excludes transition frames or includes transition frames with a duration shorter than a threshold, the computer system 110 can determine that additional transition frames are to be presented at a start or an end of a presentation of the targeted content file 152. The transition frames may be available from a transition file. The content metadata 132 can indicate the transition frames that are to be presented and an association of the transition frames with the cue points 134. So, the content instructions 114 can indicate or include the video content file 142, the transition file, and the targeted content file 152.

Figure 2:
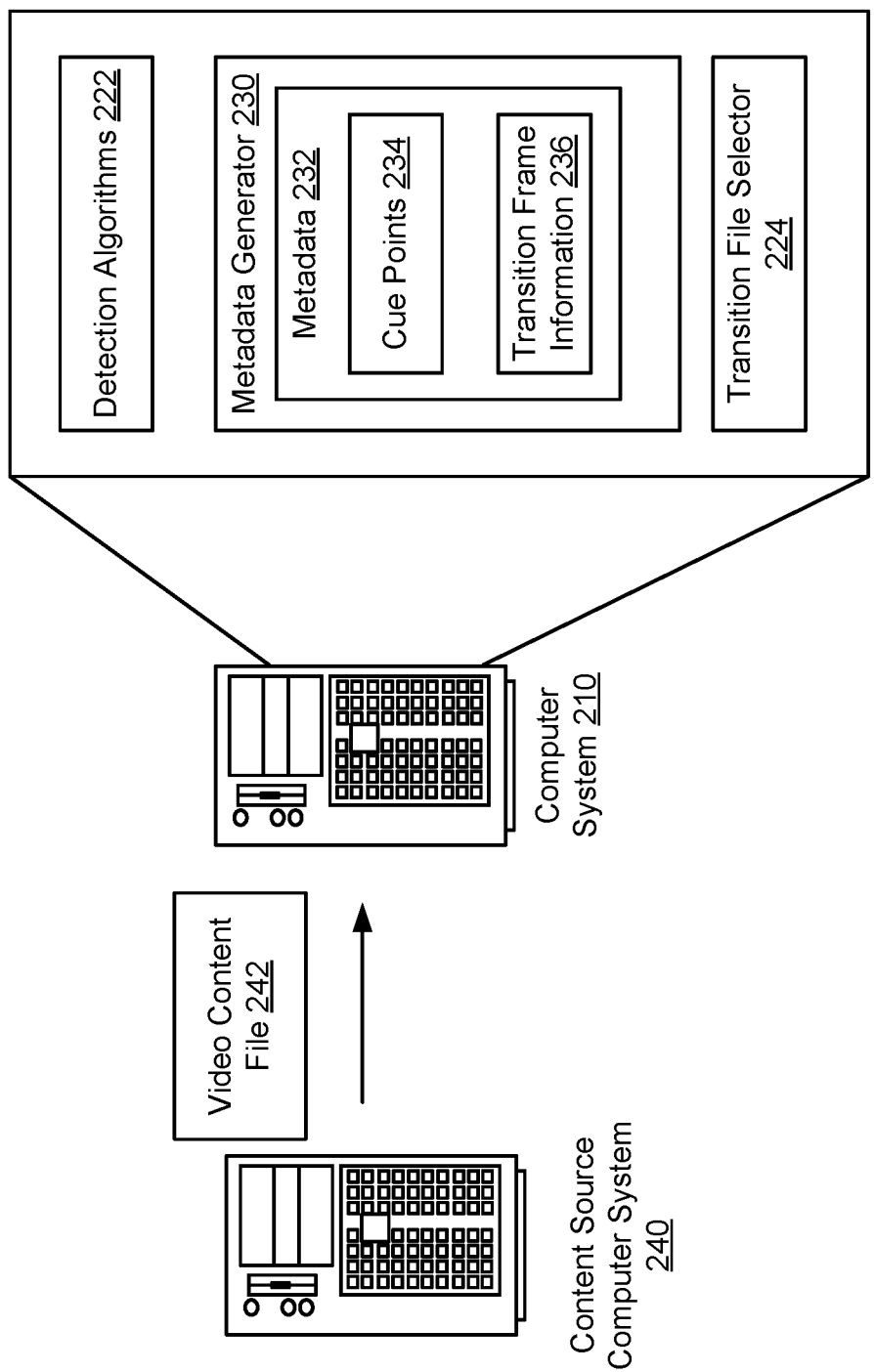
FIG. 2 illustrates metadata generation for content and a transition file, according to a particular embodiment.

FIG. 2 illustrates metadata generation for content and a transition file, according to a particular embodiment. A computer system 210, which is an example of the computer system 110 in FIG. 1, receives a video content file 242 from a content source computer system 240. The video content file 242 may be received in response to a playback request received by the computer system 210 from a computing device.

In an example, the computer system 210 analyzes the video content file 242 to generate metadata 232 and determine a transition file that is to be sent with the video content file 242 and a targeted content file to the computing device in response to the playback request. The computer system 210 can run detection algorithms 222 on the video content file 242 to determine cue points and transition frames included in the video content file 242. In some instances, cue points 234 of the video content file 242 may be predefined, so the detection algorithms 222 may not include a cue point detection algorithm. In other instances, the detection algorithms 222 involve a cue point detection algorithm to detect the cue points 234. The cue point detection algorithm may be a scene change algorithm that looks at a color histogram, and if the color change is above a threshold, the change indicates a scene change and the cue point detection algorithm determines that there is a cue point at that location (e.g., after the last frame before the scene changes). A metadata generator 230 of the computer system 210 can then store the cue points 234 in metadata 232 associated with the video content file 242. In addition, the detection algorithms 222 can include a transition detection algorithm that detects transitions frames (e.g., black frames) between video content. The transition detection algorithm may also be a scene detection algorithm that looks for a black (or other main color), unchanging scene for a time period. Upon detecting a transition frame, the metadata generator 230 can store transition frame information 236 (e.g., an indication and location) about the transition frame in the metadata 232.

The computer system 210 can also determine one or more properties of the video content file 242. The properties may include a sample rate and/or an aspect ratio. The metadata generator 210 may store an indication of the properties in the metadata 232.

A set of transition frames having a duration of a target value (e.g., one second) may need to be presented before and after each cue point. So, the computer system 210 can determine whether the video content file 242 includes such transition frames, or if any additional transition frames should be added. One or more transition frames may need to be added if the video content file 242 is lacking transition frames before or after a cue point or if the duration of the transition frames before or after a cue point is shorter than the target value. For instance, the computer system 210 may determine that the video content file 242 includes one second of transition frames at the start of a first cue point and one second of transition frames after the first cue point. The computer system 210 may also determine that the video content file 242 includes one second of transition frames at the start of a second cue point and does not include any transition frames after the second cue point. The metadata generator 230 can store this information as the transition frame information 236 in the metadata 232. That is, the transition frame information 236 can indicate the duration of each set of transition frames included in the video content file 242 and their association to a particular cue point of the cue points 234. The metadata 232 may also include an indication that no additional set of transition frames is to be presented in association with the first cue point since transition frames with durations of the target value are included before and after the first cue point.

Since the video content file 242 lacks a transition frame after the second cue point, the computer system 210 can determine that an additional set of transition frames is to be presented at the end of the presentation of targeted content presented at the second cue point. The computer system 210 can determine a duration for the additional set of transition frames. The duration of the additional set of transition frames can depend on the duration of the existing transition frames in the video content file 242 and their location relative to the cue points 234. So, since the video content file 242 lacks a transition frame at the end of the second cue point, the computer system 210 can determine the duration for the additional set of transition frames to be one second (or any other target value for the duration). Alternatively, if the computer system 210 determines that the video content file 242 includes a set of transition frames of 0.5 seconds after the second cue point, the computer system 210 may determine a difference between the target value and the duration and determine that the additional set of transition frames is to have a duration of 0.5 seconds (e.g., equal to the difference). So, the value for duration of the additional set of transition frame can be based on the duration of the included transition frames in the video content file 242 and a location of the included transition frames relative to the cue points 234. The metadata generator 230 can store an indication that the additional set of transition frames is to be presented and that the additional set of transition frames is associated with the second cue point in the metadata 232. The metadata 232 may additionally indicate the duration of the additional set of transition frames. Or, more simply, the metadata 232 may indicate that the video content file 242 excludes a transition frame after the second cue point. In this case, the determination of the duration of the additional set of transition frames can be done at runtime.

The computer system 210 can include a transition file selector 224 from which the computer system 210 selects a transition file from a set of transition files based on a duration of the transition file matching the duration of the transition frames that are to be added in addition to the transition frames included in the video content file 242. So, if the metadata 232 indicates that the additional set of transition frames is to have duration of one second, the transition file selector 224 can select a transition file having a duration of one second. The transition file selector 224 may determine that multiple transition files have a length equal to the duration, but different properties (e.g., sample rates and/or aspect ratios). So, the transition file selector 224 can select the transition file based on a property of the transition file matching the property of the video content file 242 (that may be stored in the metadata 232).

In an example, a transition file includes silent audio and the additional transition frame(s) each have a same visual property (e.g., black frames). Or a transition file may have silent audio and the additional transition frame(s) each have a different visual property. The computer system 210 may determine a visual property of a frame of the video content file 242 associated with a cue point (e.g., a last frame before the cue point) and a visual property of a frame of the targeted content associated with the cue point (e.g., a first frame of the targeted content presented at the cue point). The transition file selector 224 can select the transition file based on a visual property of the transition file, the visual property of the frame of the video content file 242, and the visual property of the frame of the targeted content. For instance, if the visual property of the frame of the video content file 242 indicates that the frame is all blue and the visual property of the frame of the targeted content indicates that the frame is all yellow, the transition file selector 224 can select a transition file with transition frames that transition from blue to yellow.

Once the metadata 232 is generated and a transition file is selected, the computer system 210 can send data (e.g., a manifest or the configuration file 138 in FIG. 1) indicating or including the video content file 242, the transition file, and a targeted content file including the targeted content to the computing device. The video content of the video content file 242 is then presented with the targeted content presented with the appropriate transition frames at the cue point 234.

Figure 3:
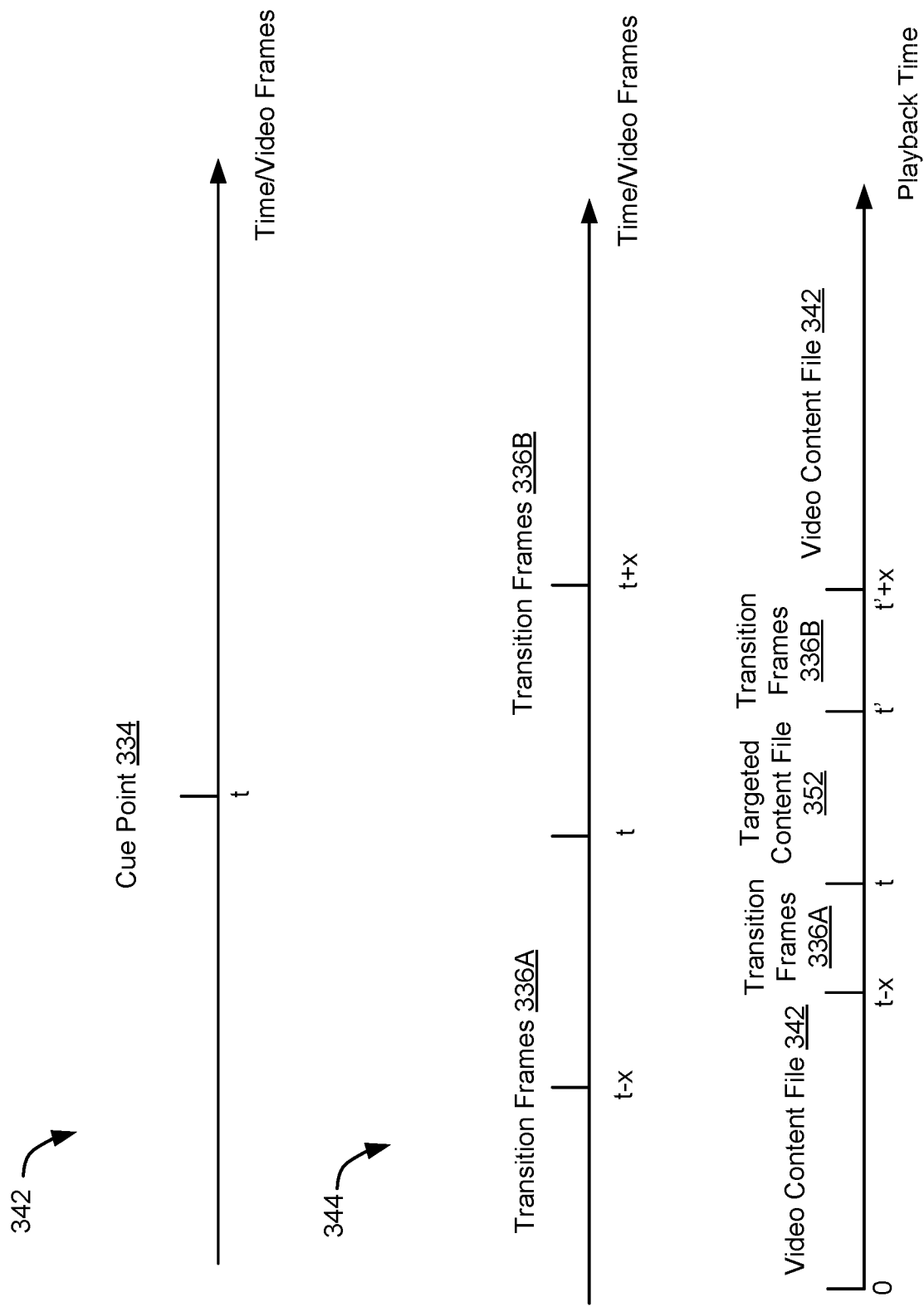
FIG. 3 illustrates an example of transition frame insertion, according to a particular embodiment.

FIG. 3 illustrates an example of transition frame insertion, according to a particular embodiment. An arrow is shown representing time and/or video frames of a video content file 342. The video content file 342 includes a cue point 334 where targeted content is to be presented at location "t". For instance, location "t" may correspond to a time of ten minutes. As illustrated, the video content file 342 does not include any transition frames before or after the cue point 334.

A computer system (e.g., computer system 110 in FIG. 1) may generate or select a transition file 344 that includes transition frames 336A-336B based on the video content file 342. For instance, since the video content file 342 lacks transition frames before and after the cue point 334, the transition file 344 can include the transition frames 336A-336B that are to be presented before and after the cue point 334, respectively. That is, transition frames 336A are at a location immediately before the cue point 334 and the transition frames 336B are at a location immediately after the cue point 334. The duration of the transition frames 336A-336B can satisfy a target value. So, if the target value is x seconds (e.g., 1.5 seconds), then the duration of each of the transition frames 336A-336B can be x seconds. Transition frames 336A can then begin at t-x seconds and transition frames 336B can end at t+x seconds.

A timeline of overall playback of the video content file 342, the transition file 344, and a targeted content file 352 that includes the targeted content that is to be played at the cue point 334 is also shown. From time zero to "t-x," video content of the video content file 342 is presented. Then, from time "t-x" to "t," the transition frames 336A of the transition file 344 are presented before the targeted content of the targeted content file 352 are presented at time "t," which corresponds to the cue point 334. The targeted content ends at time "t'" (e.g., a minute after "t"). The transition frames 336B of the transition file 344 are then presented from time "t'" to "t'+x" when the video content of the video content file 342 resumes.

Figure 4:
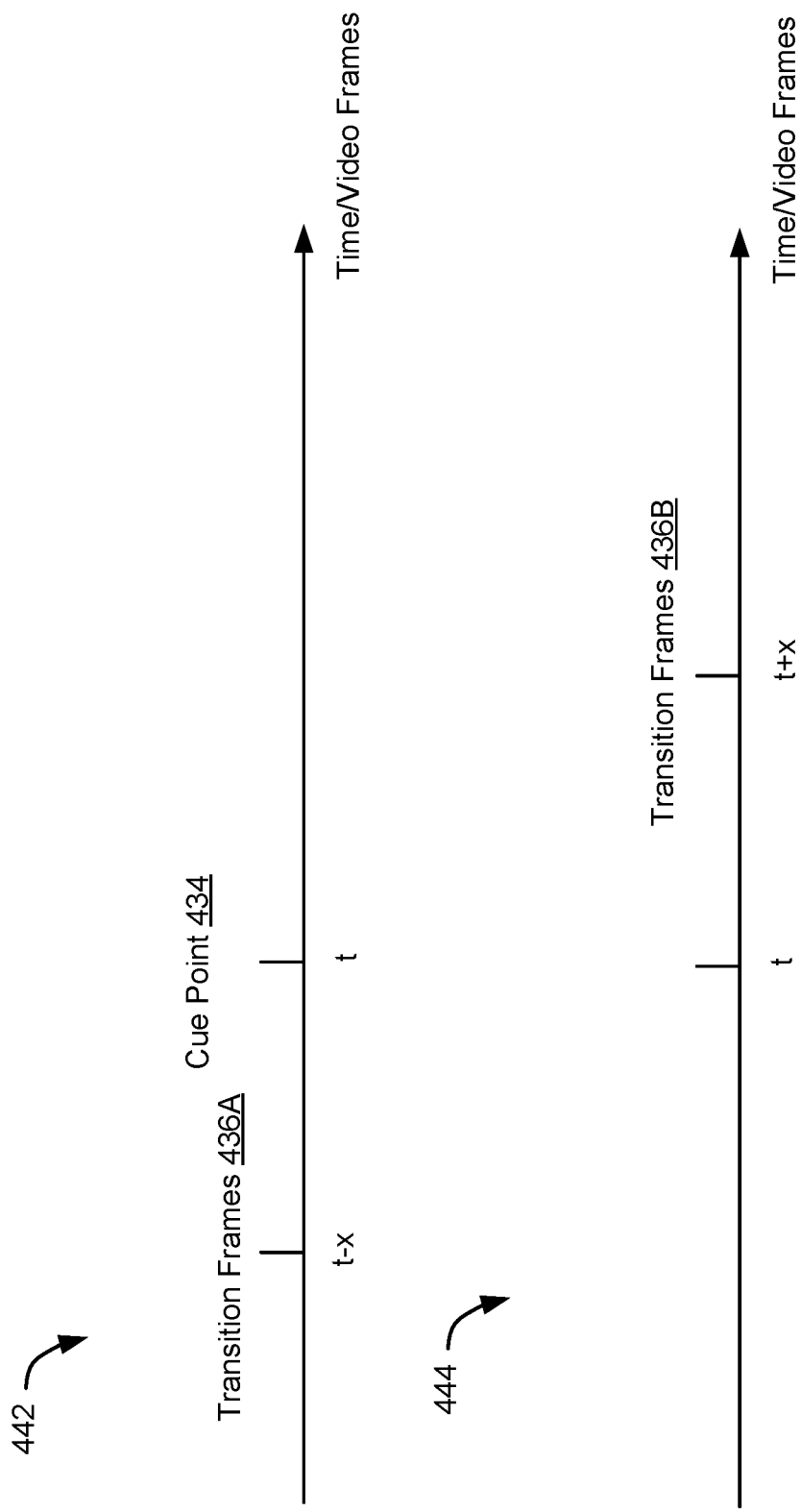
FIG. 4 illustrates another example of transition frame insertion, according to a particular embodiment.

FIG. 4 illustrates another example of transition frame insertion, according to a particular embodiment. An arrow is shown representing time and/or video frames of a video content file 442. The video content file 442 includes a cue point 434 where targeted content is to be presented at location "t". For instance, location "t" may correspond to a time of ten minutes. The video content file 442 also includes transition frames 436A before the cue point 434 that begins at a time of t-x. The duration of the transition frames 436A can be x seconds, so that the transition frames 436A occur immediately before the cue point 434. In addition, the duration of x seconds can be at least a threshold duration of a target value for the duration of transition frames. For instance, the duration may be 1.5 seconds and the target value may be 1.5 seconds.

A computer system (e.g., computer system 110 in FIG. 1) may generate or select a transition file 444 that includes transition frames 436B based on the video content file 442. For instance, since the video content file 442 lacks transition frames after the cue point 434, the transition file 444 can include the transition frames 436B that are to be presented after the cue point 434. The duration of the transition frames 436B can be at least the length of the target value. So, if the target value is x seconds (e.g., 1.5 seconds), then the duration of the transition frames 436B can be x seconds. The transition frames 436B can end at t+x seconds. Overall playback may be similar to that shown in FIG. 3, with the transition file 444 only being presented after the targeted content is presented, since the video content file 442 includes the transition frames 436A being presented before the cue point 434 for the targeted content.

Figure 5:
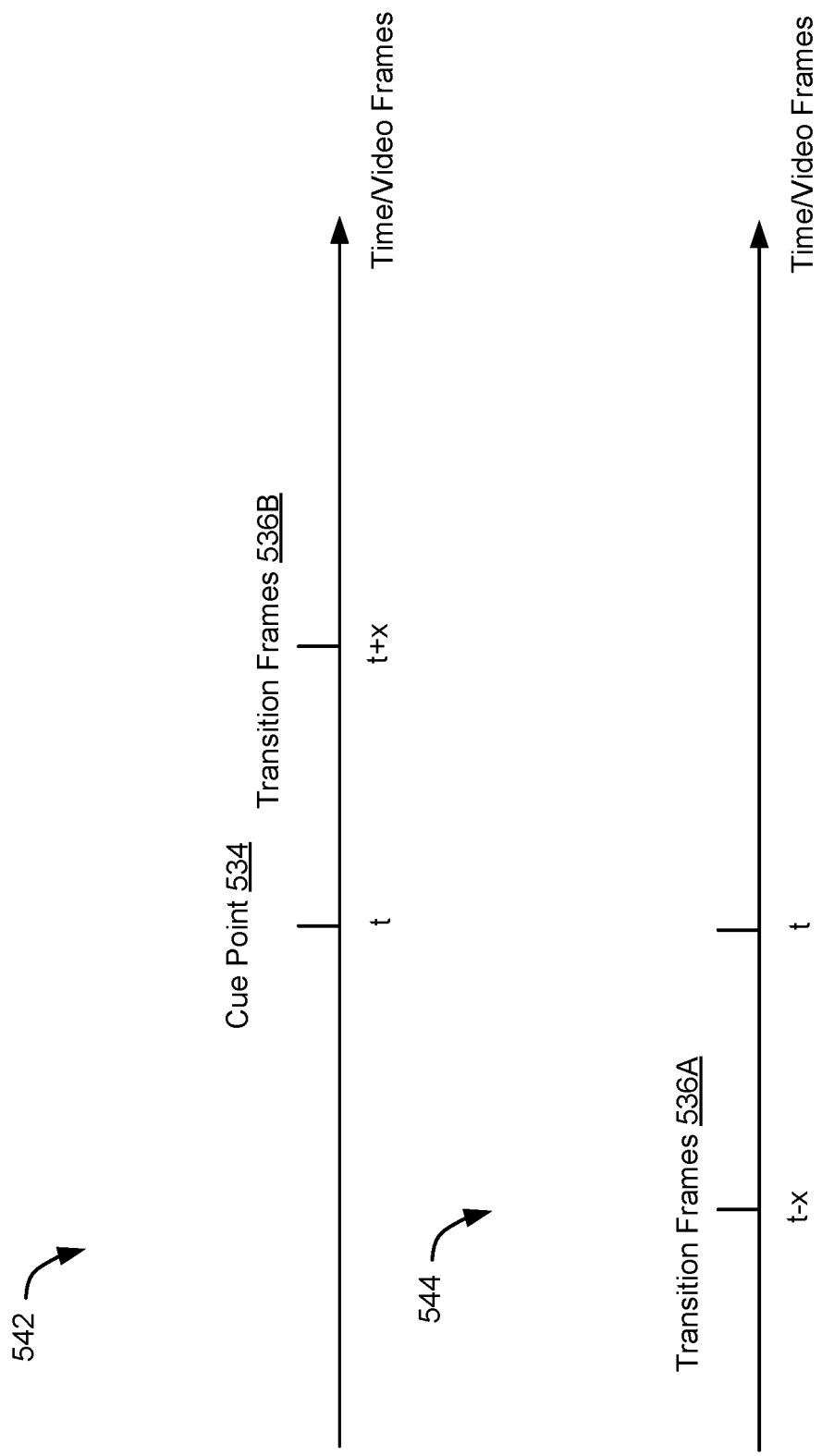
FIG. 5 illustrates another example of transition frame insertion, according to a particular embodiment.

FIG. 5 illustrates another example of transition frame insertion, according to a particular embodiment. An arrow is shown representing time and/or video frames of a video content file 542. The video content file 542 includes a cue point 534 where targeted content is to be presented at location "t". For instance, location "t" may correspond to a time of ten minutes. The video content file 542 also includes transition frames 536B after the cue point 534 that ends at a time of t+x. The duration of the transition frames 536B can be x seconds, so that the transition frames 536B occur immediately after the cue point 534. In addition, the duration of x seconds can be at least a threshold duration of a target value for the duration of transition frames. For instance, the duration may be 1.5 seconds and the target value may be 1.5 seconds.

A computer system (e.g., computer system 110 in FIG. 1) may generate or select a transition file 544 that includes transition frames 536A based on the video content file 542. For instance, since the video content file 542 lacks transition frames before the cue point 534, the transition file 544 can include the transition frames 536A that are to be presented before the cue point 534. The duration of the transition frames 536A can be at least the length of the target value. So, if the target value is x seconds (e.g., 1.5 seconds), then the duration of the transition frames 536A can be x seconds and the transition frames 536A can begin at t-x seconds. Overall playback may be similar to that shown in FIG. 3, with the transition file 544 only being presented before the cue point 534 at which the targeted content is presented, since the video content file 542 includes the transition frames 536B being presented after the targeted content.

Figure 6:
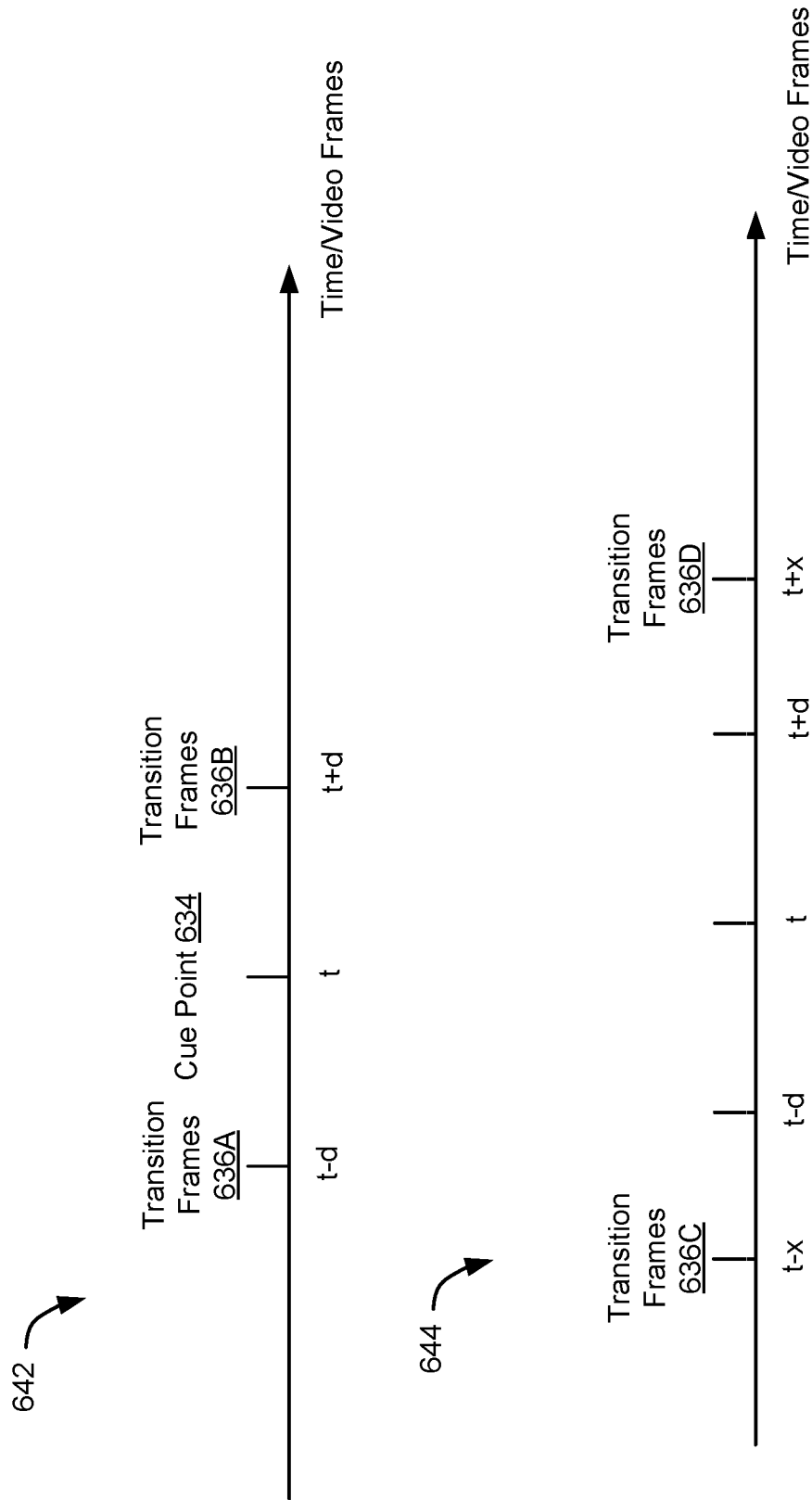
FIG. 6 illustrates another example of transition frame insertion, according to a particular embodiment.

FIG. 6 illustrates another example of transition frame insertion, according to a particular embodiment. An arrow is shown representing time and/or video frames of a video content file 642. The video content file 642 includes a cue point 634 where targeted content is to be presented at location "t". For instance, location "t" may correspond to a time of ten minutes. The video content file 642 also includes transition frames 636A-636B before and after the cue point 634, respectively. Each of the transition frames 636A-636B are illustrated as having a duration of d seconds, so transition frames 636A begins at time t-d and transition frames 636B end at time t+d. The duration of d seconds may be 0.25 seconds.

A computer system (e.g., computer system 110 in FIG. 1) may generate or select a transition file 644 that includes transition frames 636C-636D based on the video content file 642. For instance, since there may be a target value (e.g., x seconds) for a duration of the transition frames before and after a cue point. The computer system can compare the durations of the transition frames 636A-636B to the target value to determine whether additional transition frames are to be included in the transition file 644. As an example, the target value may be 1.5 seconds. So, upon determining that each of the transition frames 636A-636B are 0.25 seconds, the transition file 644 may be generated with the transition frames 636C-636D that are each 1.25 seconds long. Transition frames 636C can occur from time t-x to time t-d and transition frames 636D can occur from time t+d to time t+x.

Although not shown in FIGS. 3-6, a targeted content file may additionally include transition frames that can factor into the selection of the transition frame. As an example, the target value for transition frames before a cue point may be one second. A video content file can include 0.75 seconds of transition frames before the cue point. In addition, a targeted content file that is to be presented at the cue point may have 0.25 seconds of transition frames before the targeted content begins. As such, a transition file with additional transition frames for before the cue point may not be needed since the combination of the transition frames in the video content file and the targeted content file meet the target value.

Figure 7:
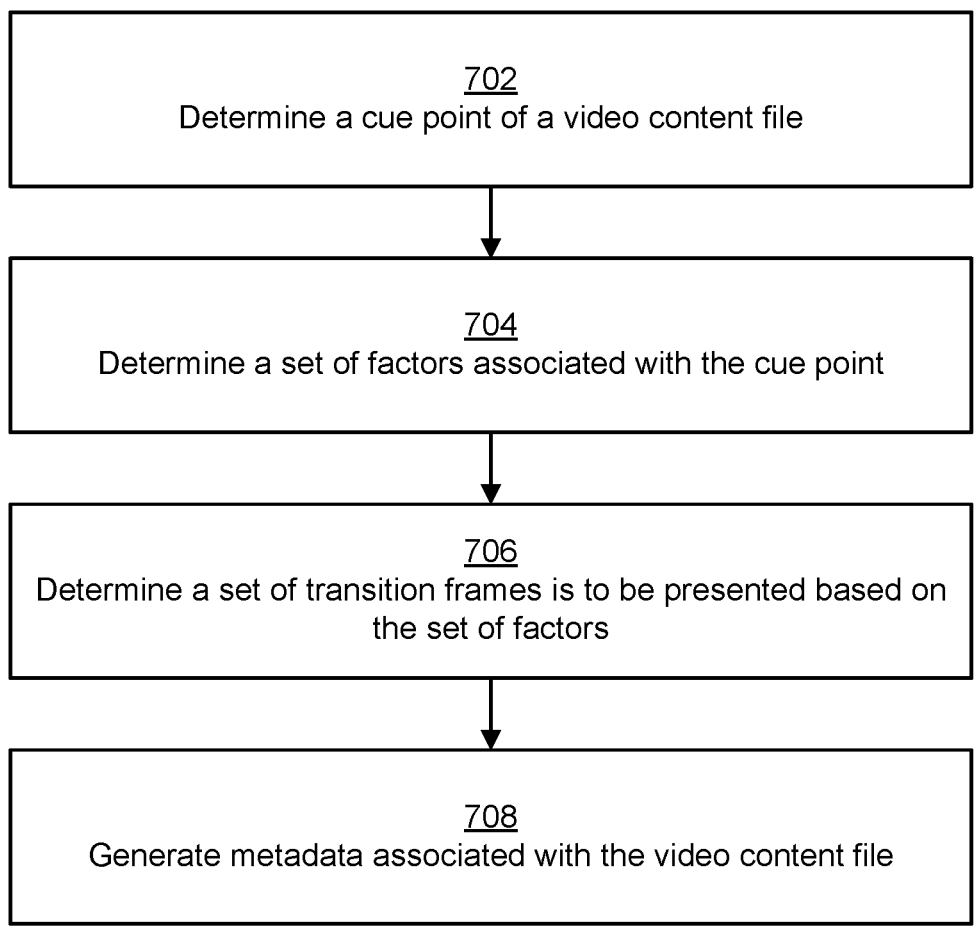
FIG. 7 illustrates an example flow of a process for generating metadata related to content files for use with transition files, according to a particular embodiment.
Figure 8:
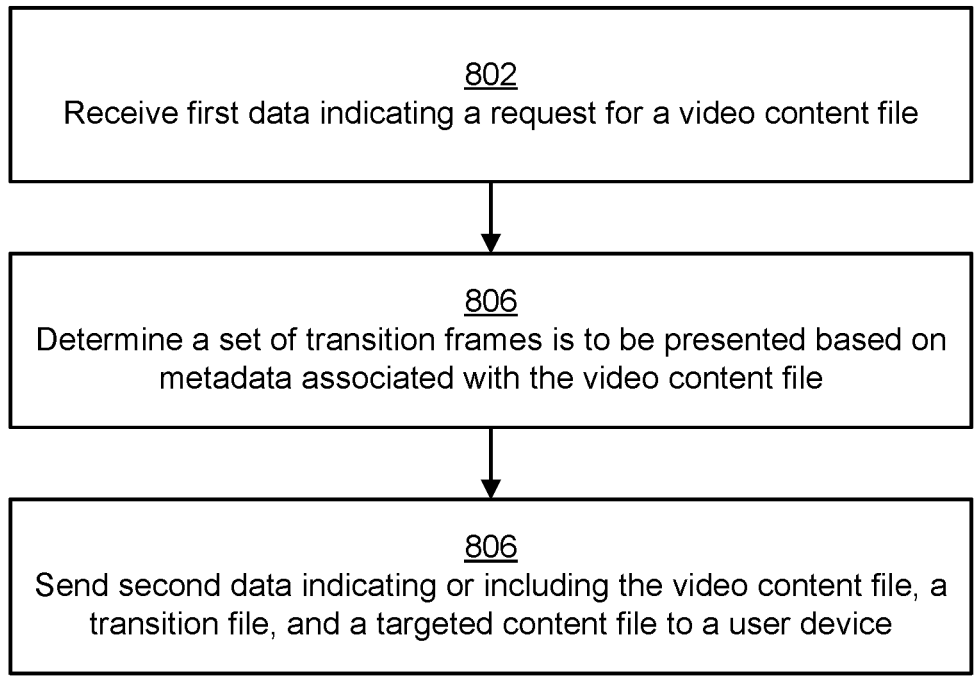
FIG. 8 illustrates an example flow of a process for content presentation using content files and transition files, according to a particular embodiment.

FIGS. 7-8 illustrate example flows for processes associated transition files for use with content files and related metadata. Some or all of the processes (or any other processes described herein, or variations, and/or combinations thereof) may be performed under the control of one or more computer systems, such as the computer system 110 in FIG. 1, configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

FIG. 7 illustrates an example flow of a process for generating metadata related to content files for use with transition files, according to a particular embodiment. In an example, the flow includes operation 702, where the computer system determines a cue point of a video content file. The cue point is a location (e.g., time or frame) at which targeted content is to be presented. The cue point may be determined by running one or more algorithms on the video content file or data extracted from the video content file.

In an example, the flow includes operation 704, where the computer system determines a set of factors associated with the cue point. The set of factors can include whether the video content file includes a set of transition frames associated with the cue point and a duration of the set of transition frames when the set of transition frames is included in the video content file. In some instances, the video content file may include transition frames before or after the cue point, but not both before and after the cue point.

In an example, the flow includes operation 706, where the computer system determines an additional set of transition frames is to be presented based on the set of factors. The additional set of transition frames can be presented at a start of a presentation of the targeted content at the cue point or at an end of the presentation of the targeted content. The computer system may determine that a target value of a duration of the transition frames is above a threshold, so if the video content file lacks transition frames before or after the cue point and/or the durations of the transition frames of the video content file are below the target value, the computer system can determine that the additional set of frames is to be presented. The additional set of frames can be available from a transition file that is separate from the video content file and from a targeted content file that includes the targeted content.

In an example, the flow includes operation 708, where the computer system generates metadata associated with the video content file. The metadata indicates that the additional set of transition frames is to be presented. The metadata also indicates an association of the additional set of transition frames with the cue point.

FIG. 8 illustrates an example flow of a process for content presentation using content files and transition files, according to a particular embodiment. In an example, the flow includes operation 802, where the computer system receives first data indicating a request for a video content file. The first data can be received from a user device in response to the user device receiving a user selection of video content associated with the video content file.

In an example, the flow includes operation 804, where the computer system determines a set of transition frames is to be presented based on metadata associated with the video content file. The set of transition frames is to be presented at a start of a presentation of targeted content at a cue point of the video file or at an end point of the presentation of the targeted content. The metadata can indicate whether transition frames are present for the cue points of the video content file and a duration of each of the transition films. So, if the metadata indicates that there is no transition frame before or after a cue point or that an included set of transition frames is too short, the computer system can determine that the set of transition frames is to be presented. The set of transition frames can be available from a transition file that is separate from the video content file. The metadata can indicate that the set of transition frames is to be presented and an association of the set of transition frames with the cue point.

In an example, the flow includes operation 806, where the computer system sends second data indicating or including the video content file, the transition file, and a targeted content file to the user device. The second data is sent in response to the request received from the user device. The second data can cause the video content to be presented along with the targeted content and the transition frames.

Figure 9:
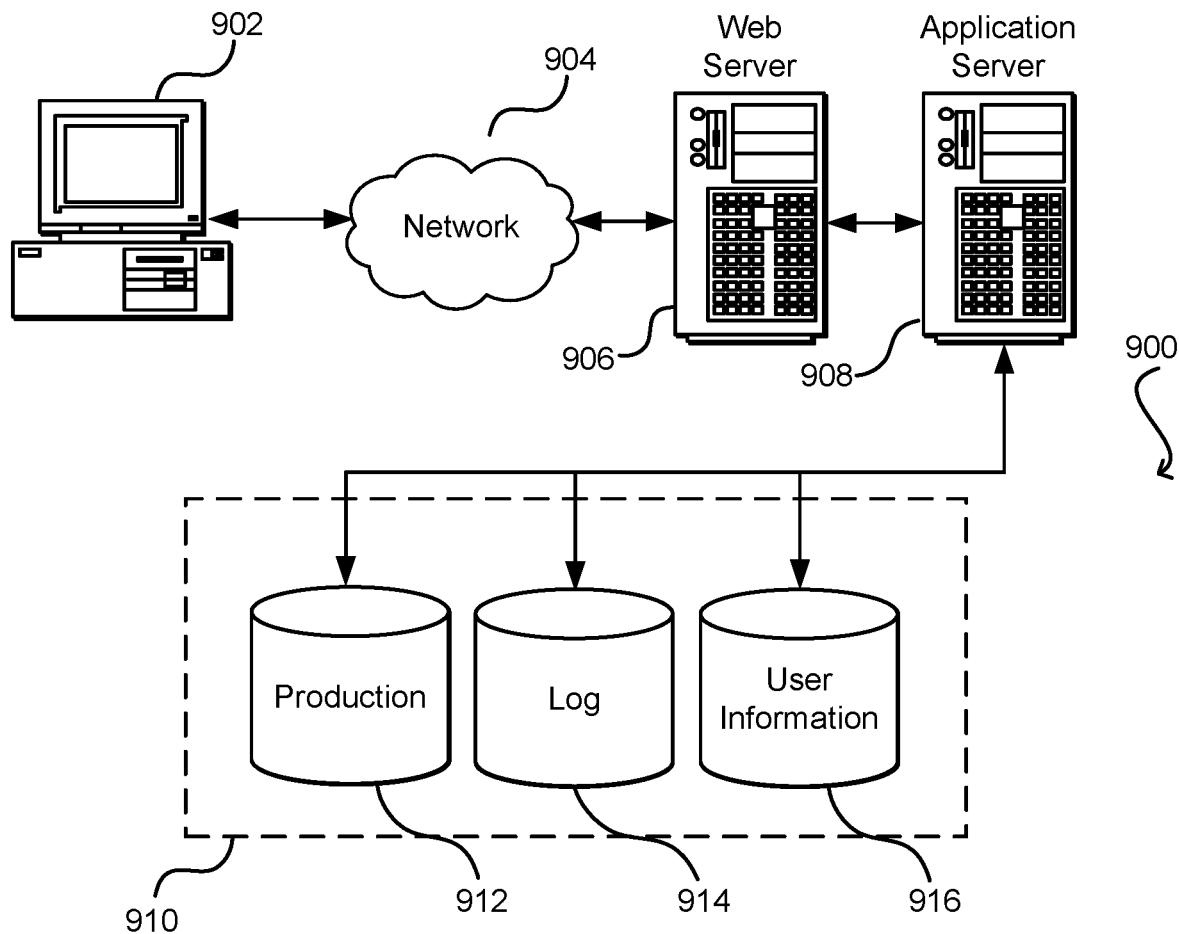
FIG. 9 illustrates aspects of an example environment for implementing aspects in accordance with various embodiments.

FIG. 9 illustrates aspects of an example environment 900 for implementing aspects in accordance with various embodiments. As will be appreciated, although a Web-based environment is used for purposes of explanation, different environments may be used, as appropriate, to implement various embodiments. The environment includes an electronic client device 902, which can include any appropriate device operable to send and receive requests, messages, or information over an appropriate network 904 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 906 for receiving requests and serving content in response thereto, although for other networks an alternative device serving a similar purpose could be used as would be apparent to one of ordinary skill in the art.

The illustrative environment includes at least one application server 908 and a data store 910. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 902 and the application server 908, can be handled by the Web server. It should be understood that the Web and application servers are not required and are merely example components, as structured code discussed herein can be executed on any appropriate device or host machine as discussed elsewhere herein.

The data store 910 can include several separate data tables, databases or other data storage mechanisms and media for storing data relating to a particular aspect. For example, the data store illustrated includes mechanisms for storing production data 912 and user information 916, which can be used to serve content for the production side. The data store also is shown to include a mechanism for storing log data 914, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the computing device 902. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system (e.g., the example environment 900) in FIG. 9 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from computing devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A system comprising:
one or more processors; and
one or more memory storing instructions, that upon execution by the one or more processors, configure the system to:
determine a cue point of a video content file at which targeted content is to be presented;
determine a set of factors associated with the cue point, the set of factors comprising (i) whether the video content file includes a first set of transition frames associated with the cue point and (ii) a duration of the first set of transition frames when the first set of transition frames is included in the video content file;
determine, based at least in part on the set of factors, that a second set of transition frames is to be presented at a start of a presentation of the targeted content at the cue point or at an end of the presentation of the targeted content, the second set of transition frames available from a transition file that is separate from the video content file and from a targeted content file that includes the targeted content; and
generate metadata associated with the video content file, the metadata indicating that the second set of transition frames is to be presented and an association of the second set of transition frames with the cue point.

2. The system of claim 1, wherein the one or more memory store further instructions, that upon execution by the one or more processors, further configure the system to:
receive, from a user device, first data indicating a playback request for the video content file;

determine the video content file based at least in part on the first data;

determine, based at least in part on an association between the video content file and the metadata, that the metadata indicates that the second set of transition frames is to be presented; and send, to the user device in support of the playback request, second data indicating or including the video content file, the transition file, and the targeted content file.

3. The system of claim 1, wherein the one or more memory store further instructions, that upon execution by the one or more processors, further configure the system to:

determine a duration of the second set of transition frames based at least in part on the duration of the first set of transition frames and a location of the first set of transition frames relative to the cue point; and include the duration of the second set of transition frames in the metadata.

4. The system of claim 3, wherein the one or more memory store additional instructions, that upon execution by the one or more processors, additionally configure the system to:

receive, from a user device, first data indicating a playback request for the video content file;

determine the video content file based at least in part on the first data;

determine, based at least in part on an association between the video content file and the metadata, the metadata;

select, from a plurality of transition files each having a different duration, the transition file based at least in part on a duration of the transition file matching the duration of the second set of transition frames indicated by the metadata; and send, to the user device in support of the playback request, second data indicating or including the transition file.

5. A computer-implemented method comprising:

determining a cue point of a video content file at which targeted content is to be presented;

determining that a set of transition frames is to be presented at a start of a presentation of the targeted content or at an end of the presentation of the targeted content, the set of transition frames available from a transition file that is separate from the video content file; and generating metadata associated with the video content file, the metadata indicating that the set of transition frames is to be presented and an association of the set of transition frames with the cue point.

6. The computer-implemented method of claim 5 further comprising:

determining a set of factors associated with the cue point, the set of factors comprising at least one of: (i) whether the video content file already includes one or more transition frames associated with the cue point, or (ii) a duration of the one or more transition frames when the one or more transition frames are already included in the video content file, wherein the determining that the set of transition frames is to be presented is based at least in part on the set of factors.

7. The computer-implemented method of claim 6 further comprising:

determining that the set of factors indicate that the video content file excludes the one or more transition frames;

determining a target value for a duration of the set of transition frames based at least in part on the video content file excluding the one or more transition frames; and including, in the metadata, at least one of the target value or an indication that the video content file excludes the one or more transition frames.

8. The computer-implemented method of claim 6 further comprising:

determining that the set of factors indicate that the video content file includes the one or more transition frames;

determining a value for duration of the set of transition frames based at least in part on the duration of the one or more transition frames and a location of the one or more transition frames relative to the cue point; and including, in the metadata, at least one of the value of the duration of the set of transition frames or an indication that the video content file includes the one or more transition frames.

9. The computer-implemented method of claim 5 further comprising:

determining that the video content file includes one or more transition frames located before the cue point; and determining that the set of transition frames is to be presented at the end of the presentation of the targeted content based at least in part on the one or more transition frames being located before the cue point.

10. The computer-implemented method of claim 5 further comprising:

determining that the video content file includes one or more transition frames located after the cue point; and determining that set of the transition frames is to be presented at the start of the presentation of the targeted content based at least in part on the one or more transition frames being located after the cue point.

11. The computer-implemented method of claim 5 further comprising:

determining that the video content file includes one or more transition frames located before and after the cue point; and determining that set of the transition frames is to be presented at the start and the end of the presentation of the targeted content based at least in part on the one or more transition frames being located before and after the cue point.

12. The computer-implemented method of claim 5 further comprising:

determining that the video content file includes one or more transition frames;

determining a duration of the one or more transition frames;

comparing the duration to a threshold duration; and determining that the set of the transition frames is to be presented based at least in part on a result of the comparing indicating that the duration is smaller than the threshold duration.

13. The computer-implemented method of claim 5 further comprising:

determining that the video content file includes one or more transition frames;

determining a first duration of the one or more transition frames;

determining a difference between a target duration and the first duration; and determining that the set of the transition frames is to have a second duration equal to the difference.

14. The computer-implemented method of claim 5 further comprising:

determining an additional cue point of the video content file at which additional targeted content is to be presented;

determining that the video content file already includes one or more additional transition frames associated with the additional cue point;
determine a duration of the one or more additional transition frames; and
including, in the metadata and based at least in part on the duration, an indication that no additional set of transition frames is to be presented in association with the additional cue point.

15. One or more non-transitory computer-readable storage media storing instructions, that upon execution on a system, configure the system to perform operations comprising:
receiving, from a user device, first data indicating a request for a video content file;
determining, based at least in part on metadata associated with the video content file, that a set of transition frames is be presented at a start of a presentation of targeted content at a cue point of the video content file or at an end of the presentation of the targeted content, the set of transition frames available from a transition file that is separate from the video content file, the metadata associated with the video content file and indicating that the set of transition frames is to be presented and an association of the set of transition frames with the cue point; and
sending, to the user device in support of the request, second data indicating or including the video content file, the transition file, and a targeted content file that includes the targeted content.

16. The one or more non-transitory computer-readable storage media of claim 15, wherein the operations further comprise:
determining a duration of the set of transition frames, wherein the duration is indicated by the metadata; and
selecting, from a plurality of transition files each having a different duration, the transition file based at least in part on a duration of the transition file matching the duration of the set of transition frames.

17. The one or more non-transitory computer-readable storage media of claim 15, wherein the operations further comprise:
determining a duration of the set of transition frames, wherein the duration is indicated by the metadata;
determining a property of the video content file, the property comprising at least one of a sample rate or an aspect ratio; and
selecting, from a plurality of transition files each having a length equal to the duration but a different property, the transition file based at least in part on a property of the transition file matching the property of the video content file.

18. The one or more non-transitory computer-readable storage media of claim 15, wherein the operations further comprise:
determining a visual property of a first frame of the video content file, the first frame associated with the cue point;
determining a visual property of a second frame of the targeted content file, the second frame associated with the cue point; and
selecting, from a plurality of transition files each having a different visual property, the transition file based at least in part on a visual property of the transition file, the visual property of the first frame, and the visual property of the second frame.

19. The one or more non-transitory computer-readable storage media of claim 15, wherein the transition file is separate from the targeted content file and comprises silent audio and the set of transition frames each having the same visual property.

20. The one or more non-transitory computer-readable storage media of claim 15, wherein the transition file is separate from the targeted content file and comprises silent audio and the set of transition frames each having a different visual property.

* * * * *